F. H. HEADLEY.
SPRING SUSPENSION MECHANISM FOR VEHICLES.
APPLICATION FILED JUNE 1, 1922.
1,428,166.
Patented Sept. 5, 1922.
2 SHEETS—SHEET 1.
REISSUED AS NO. 15721
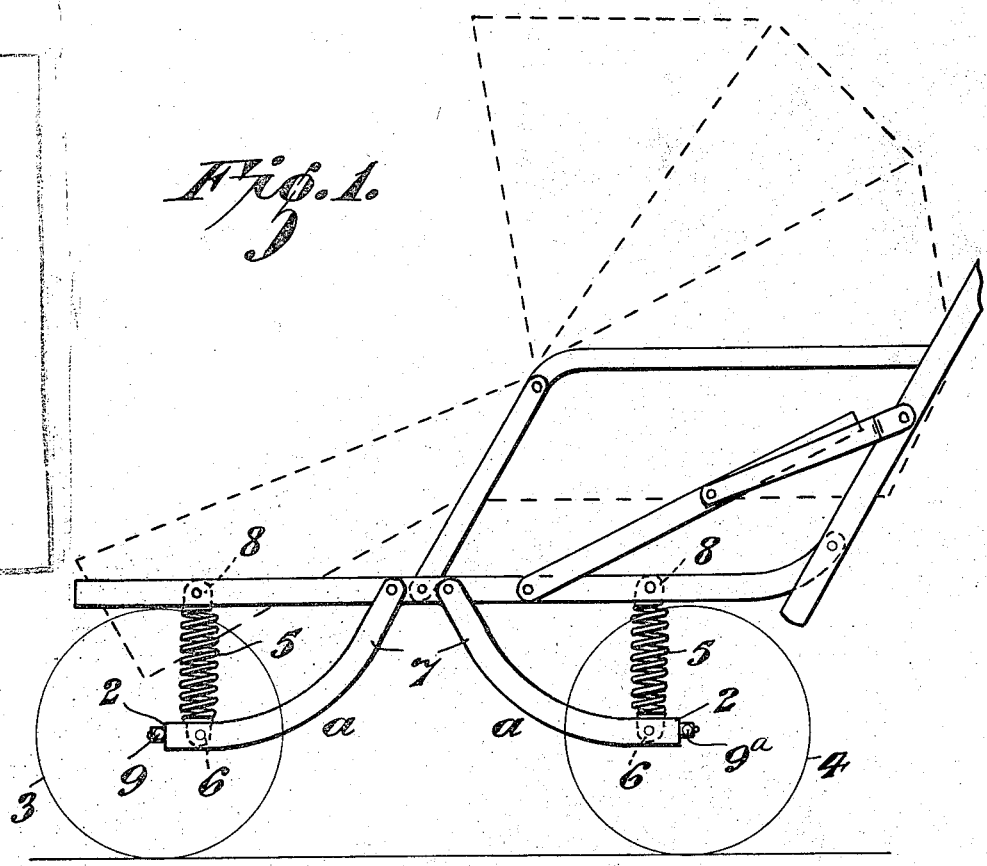
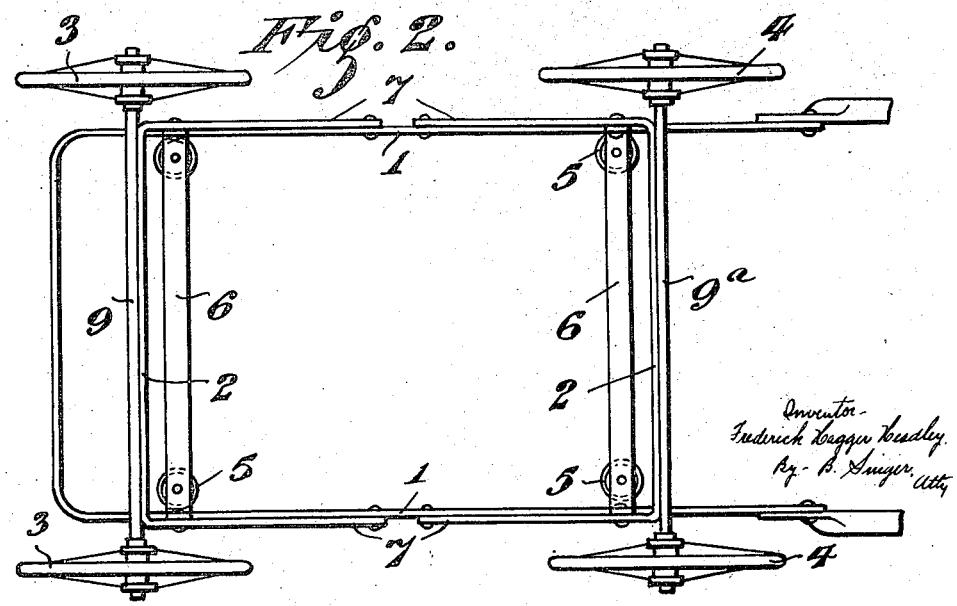

F. H. HEADLEY.
SPRING SUSPENSION MECHANISM FOR VEHICLES.
APPLICATION FILED JUNE 1, 1922.
1,428,166.
Patented Sept. 5, 1922.
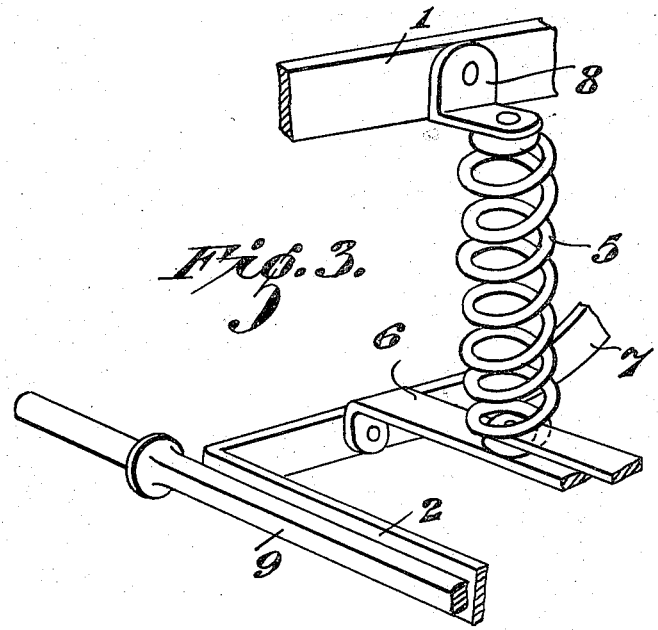
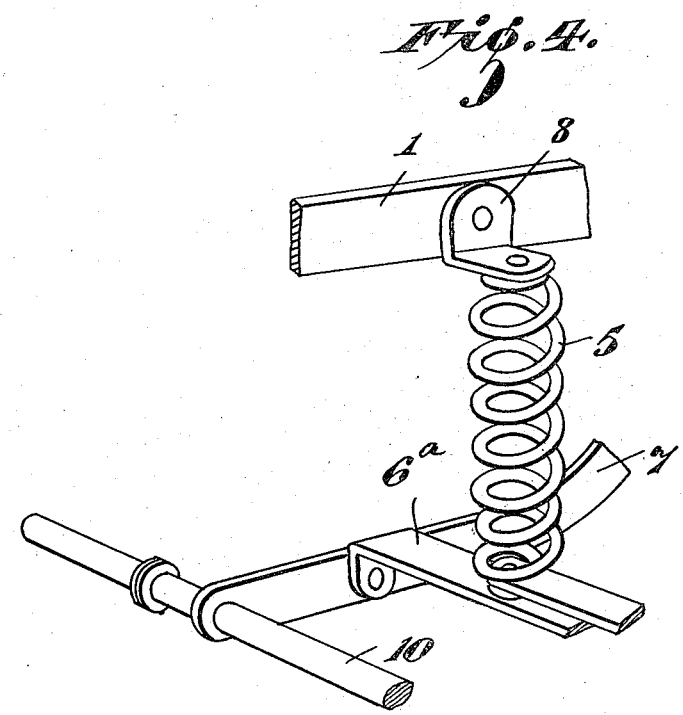

Patented Sept. 5, 1922.

1,428,166

UNITED STATES PATENT OFFICE.

FREDERICK HAGGER HEADLEY, OF BIRMINGHAM, ENGLAND.

SPRING SUSPENSION MECHANISM FOR VEHICLES.

Application filed June 1, 1922. Serial No. 565,216.

*To all whom it may concern:*

Be it known that I, FREDERICK HAGGER HEADLEY, a subject of the King of Great Britain and Ireland, residing at "Kingscroft," 53 Woodlands Road, Northfield, Birmingham, in the county of Warwick, England, have invented Improvements in Spring Suspension Mechanism for Vehicles, of which the following is a specification.

This invention comprises a spring suspension mechanism for vehicles, particularly applicable to perambulators, and the like, in which fore and rear axles extending across the vehicle are each carried by radius arms, one on each side of the vehicle, rigidly secured to the axle and in which the radius arms at the rear of the vehicle extend rearwardly from their axis to the rear axle of the vehicle, and those in the fore part of the vehicle extend forwardly from their axis to the fore axle of the vehicle.

In order that this invention may be clearly understood and readily carried into practice, reference may be had to the appended explanatory sheet of drawings, upon which:—

Figure 1 is a side elevation of a perambulator according to this invention.

Figure 2 is an inverted plan of certain parts shown in Figure 1.

Figure 3 is a detail perspective view showing the method of mounting the springs.

Figure 4 is a detail perspective view of a modification of this invention.

In a convenient embodiment of the present invention, I provide a perambulator having a frame formed with horizontal side stays or limbs 1, to which latter at a mid-position in their length are pivotally connected the extremities of the arms of two U-members *a* at positions in proximity to each other, the transverse parts 2 of which two U-members *a* are secured to the axles 9 and 9ª respectively of the fore and rear wheels 3, 4 of the perambulator. Between these transverse parts 2 of the U-members *a* or adjacent rigid parts appertaining thereto and the perambulator frame, springs 5 are incorporated. These springs 5 are advantageously of the coiled type, being located one on each side of the perambulator at front and rear.

At the bottom the springs 5 are appropriately secured to a transverse stay member 6 which is bent at right angles at each extremity and bolted, riveted or otherwise rigidly secured to the arms 7 of the U-members *a*, and being secured at the top to a bracket or angle piece 8 which is in turn secured to the frame members 1.

In the modification shown in Figure 4, the transverse part of each U-member may comprise the stay 6ª bent at right angles at each extremity and bolted, riveted, or otherwise rigidly secured to the end of a stay 7 which forms the arm of the U-member. The wheel axle 10 may rigidly be carried by this side stay 7 at a position near to its connection with the said transverse stay 6.

If desired, three or more springs may be provided in connection with the U-members, in which case the brackets 8 may be dispensed with and a transverse member, similar to the member 6, is secured to the frame 1 and the tops of the springs secured thereto.

The body of the perambulator may be collapsible, so that by the present invention a semi-collapsible perambulator is provided in which the wheels are sprung or resiliently suspended in a particularly effectual manner.

What I claim as my invention and desire to secure by Letters Patent is:

In a vehicle, a chassis, front and rear axles, U-members having transverse portions secured to the axles and having end portions which form radius arms arranged longitudinally of the vehicle, the radius arms of the front members extending rearwardly and being pivotally mounted on the chassis, and those of the rear member extending forwardly and being pivotally mounted on the chassis cross bars on the U-members, and springs between the said cross bars and the chassis.

In witness whereof I have hereunto set my hand.

FREDERICK HAGGER HEADLEY.